Figure 1:
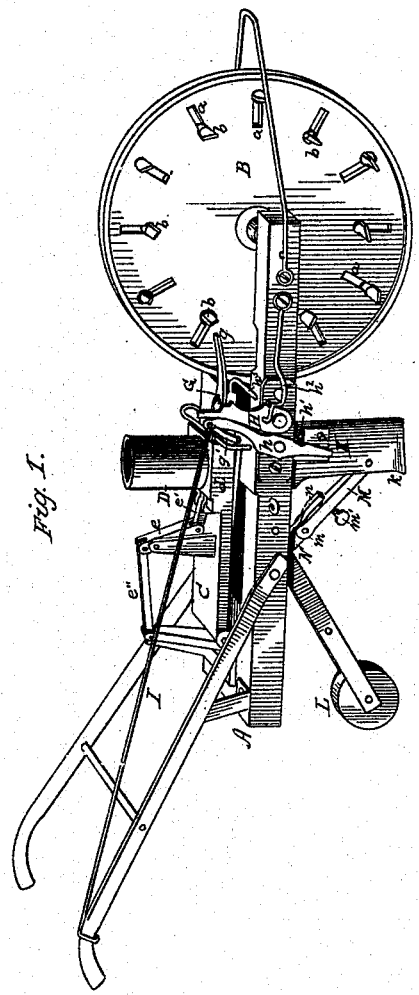

2 Sheets—Sheet 1.

E. D. & O. B. REYNOLDS.
Corn-Planter.

No. 209,293. Patented Oct. 22, 1878.

Fig. I.

WITNESSES:
C. Clarence Poole
Bartram Jevely

INVENTORS
Edmund D. Reynolds
Oliver B. Reynolds
per attys.
A. H. Evans & Co.

2 Sheets—Sheet 2.
E. D. & O. B. REYNOLDS.
Corn-Planter.
No. 209,293. Patented Oct. 22, 1878.
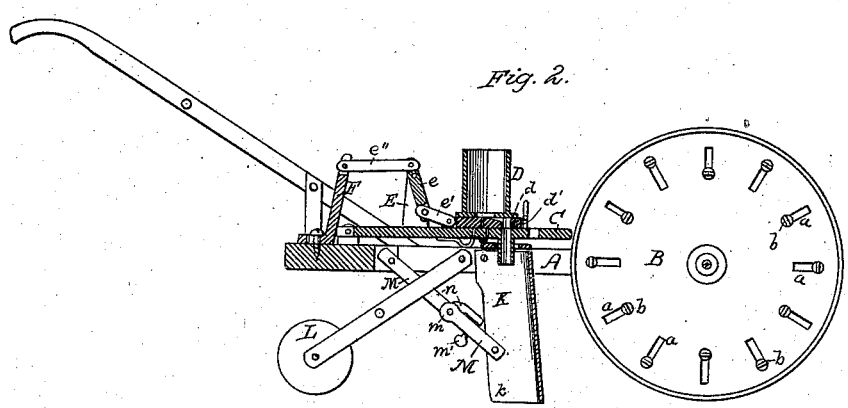
Fig. 2.
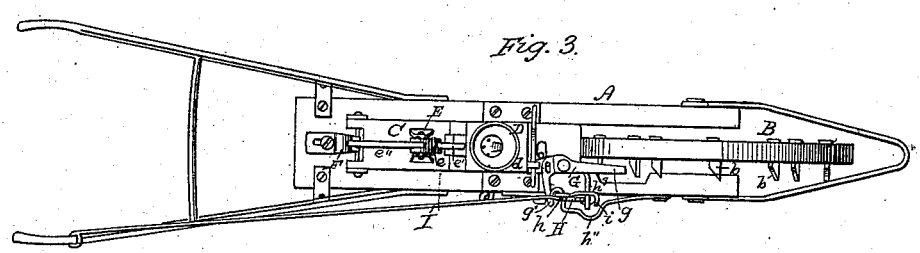
Fig. 3.
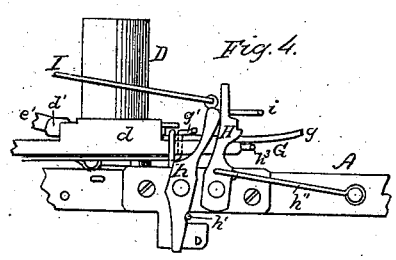
Fig. 4.
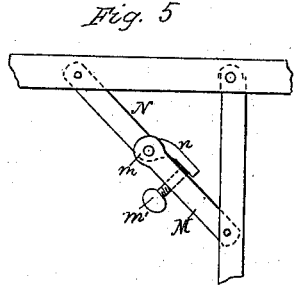
Fig. 5.
Fig. 6.
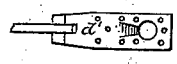
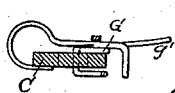
WITNESSES:
C. Clarence Poole
Bartram Jevely
INVENTORS
Edmund D. Reynolds
Oliver B. Reynolds
per attys.
A. H. Evans & Co.
N. PETERS, PHOTO-LITHOGRAPHER, WASHINGTON, D. C.

UNITED STATES PATENT OFFICE.

EDMUND D. REYNOLDS AND OLIVER B. REYNOLDS, OF BROCKTON, MASS.

IMPROVEMENT IN CORN-PLANTERS.

Specification forming part of Letters Patent No. 209,293, dated October 22, 1878; application filed February 20, 1878.

*To all whom it may concern:*

Be it known that we, EDMUND D. REYNOLDS and OLIVER B. REYNOLDS, of Brockton, Massachusetts, have invented certain new and useful Improvements in Corn-Planters, of which the following is a clear, full, and exact description, reference being had to the accompanying drawings, making a part of this specification, in which—

Figure 1 is a perspective view of a horse corn-planter with our improvements attached. Fig. 2 is a longitudinal vertical section of the same. Fig. 3 is a plan view. Fig. 4 is a partial side view enlarged. Fig. 5 is a detached view of our automatic relief-brace. Fig. 6 are details referred to.

Our invention relates to planters for dropping and planting corn and other cereals; and it consists in the devices hereinafter explained and claimed.

To enable others skilled in the art to make and use our invention, we will proceed to describe the exact manner in which we have carried it out.

In the drawings, A represents a frame-work, in the forward end of which is journaled the wheel B, provided with radial slots $a$ $a$, in which are the beveled and adjustable pins $b$ $b$, secured in position by nuts or other convenient means. Hinged to the rear of the frame A is the perforated plate C, carrying the hopper D, mounted on the intermediate boxing $d$, in which operates the perforated sliding valve $d'$, for the alternate reception and discharge of the number of grains designed for a single hill of corn. Besides the central or large perforation through which the grains pass to the hill, this valve is provided with a number of small perforations, as shown in Fig. 6, to enable the hopper to free itself from any accumulation of dust or dirt which might otherwise impede the operation of the machine. The central or large opening for passing the grain to the hill is provided with an incline in the rear, to enable the opening to clear itself of any surplus grains as the valve is thrown forward, as hereinafter explained.

In the rear of the hopper are the standards E, rigidly secured on the plate C, between which is pivoted the swinging beam $e$, bifurcated at each end. The lower end is connected with the sliding valve $d'$ by the pivoted bar $e'$, while the upper end is connected by the pivoted beam $e''$ to the post F, rigidly attached to the frame A. It is evident from this description of the mode of pivoting the swinging beam $e$ that when the forward end of the plate C is raised the leverage of the standards E forces back the lower end of the beam $e$, and draws the valve $d'$ to a position in the hopper to receive the number of grains to be dropped in the hill. When the forward end of the plate C is again suddenly dropped, the valve $d'$ is as suddenly shot forward, and the grains are thrown with a positive force to the hill.

On the forward end of the plate C is the pivoted bent lever-arm G, one portion, $g$, extending sufficiently far forward to come in contact with the pins $b$ as the wheel B revolves, the straight edge of the pins striking against the arm and raising the plate C to the required distance to cause the withdrawal of the valve $d'$ to receive the grains to be dropped. The pin then passes the arm $g$, and allows the plate to fall and throw the grains to the hill.

It is evident from the description of the wheel with its slots and adjustable pins that the machine may be adjusted to automatically drop the grains at any distance apart that may be desired, regardless of the speed at which the machine may be moving, while the reverse movement of the wheel will not affect the valve, owing to the beveled edges of the pins then coming in contact with the arm $g$ and failing to raise the plate C. At times, however, it may be desirable to regulate the dropping independently of the adjustment of the pins $b$, and to accomplish this we have adopted a novel arrangement of levers and springs, in combination with the arms of the bent lever G.

On the side of the frame A we pivot the notched arm H, against which bears the lever $h$, held in position by the spring $h'$, arranged beneath the frame. When not in use the arm and lever are held back by the spring-catch $h''$, or by any other convenient method. Extending from the front end of the plate C is a catch, $h^3$, which, when the plate is raised, as shown in Fig. 1, catches in the notch in the arm H, and is there held, keeping the plate raised until the catch is released by drawing back the arm. This is accomplished by the operator drawing back the rod I, the rear end of which is attached to the handle of the machine.

By drawing the rod I, the lever $h$ is forced back until the hook $i$, attached to this lever, comes in contact with the notched arm H, and withdraws it from the catch $h^3$ and allows the plate C to fall.

As the lever $h$ is drawn back by the rod I, and about the time that the hook $i$ reaches the arm H, the lever is brought in contact with the arm $g'$ of the bent lever G, and by forcing back the arm $g'$ causes the arm $g$ to move laterally out of the way of the pins $b$ preparatory to the fall of the plate C, when the notched arm H releases the catch $h^3$. When the arm $g$ is released from the pressure of the lever $h$, the bent lever G is forced to its normal condition by a spring arranged in its rear, and the plate C is ready to be raised by a pin, $b$, acting on the arm $g$.

Below the frame A, and beneath the drop-opening in the plate C, is the furrow-opener K, which also acts as a guide to the falling grains and conducts them to the furrow, while the flare of the wings $k$ causes the loose earth to ride over them, fall back into the furrow, and cover the grains, while the swinging roller L follows in the wake of the opener, and finishes the operation of planting by smoothing and pressing the earth over the grain.

To guard against the possibility of any breakage or injury to the machine from obstructions which the furrow-opener K might encounter—such, for instance, as rocks, stumps, and roots—we have devised a novel brace, which is adjustable to resist any desired amount of strain, but which will immediately yield to a strain greater than that for which it stands adjusted.

In the drawings, M is a bar, pivoted at one end to the rear of the furrow-opener, and bifurcated at the other, or provided with ears $m$, to receive the bar N, as shown in Fig. 5, which is pivoted between the ears $m$, and at the opposite end securely pivoted to the rear end of the frame A. The bar N is provided with bent projection $n$, which rests upon the face of the bar M when the ears $m$ are a little below the dead-center of the line of strain. By means of the thumb-screw $m'$ bearing against the projection $n$, it is evident that the dead-center may be adjusted at will, so as to regulate the resisting power of the brace formed by the bars M and N.

If the ears $m$ be raised above the dead-center of the line of strain, all resistance will be destroyed and the bars will yield, or if the ears be brought below the dead-center the resistance is complete until something is broken.

The object of this part of our invention is to provide an adjustable resisting power which may be set to resist any required force, and if any force beyond that required should present itself the brace will yield, and thus avoid breakage or damage to the machine.

By means of this construction of our resisting-brace, it may be readily set by means of the thumb-screw $m'$ to resist any desired force, and immediately yield when a greater one is presented.

Having thus explained our invention, what we claim as new, and desire to secure by Letters Patent, is—

1. The wheel B, provided with the radial slots $a\ a$ and adjustable pins $b\ b$, in combination with the plate C, hopper D, and pivoted arm $g$, substantially as and for the purpose described.

2. The perforated hinged plate C and hopper D, and sliding valve $d'$, in combination with the standards E, swinging beam $e$, bar $e'$, beam $e''$, and post F, all constructed to operate substantially as and for the purpose set forth.

3. The sliding valve $d'$, provided with a central opening beveled on the rear side, and with smaller openings or perforations, substantially as and for the purpose set forth.

4. The hinged plate C, provided with the bent lever G and catch $h^3$, in combination with the notched arm H, lever $h$, spring $h'$, and rod I, substantially as and for the purpose set forth.

5. In a corn-planter, the adjustable resisting-brace consisting of the bars M and N, with projection $n$ and thumb-screw $m'$, constructed to operate substantially as and for the purpose set forth.

EDMUND D. REYNOLDS.
OLIVER B. REYNOLDS.

Witnesses:
ISAAC E. SNELL,
Z. S. REYNOLDS.